UNITED STATES PATENT OFFICE.

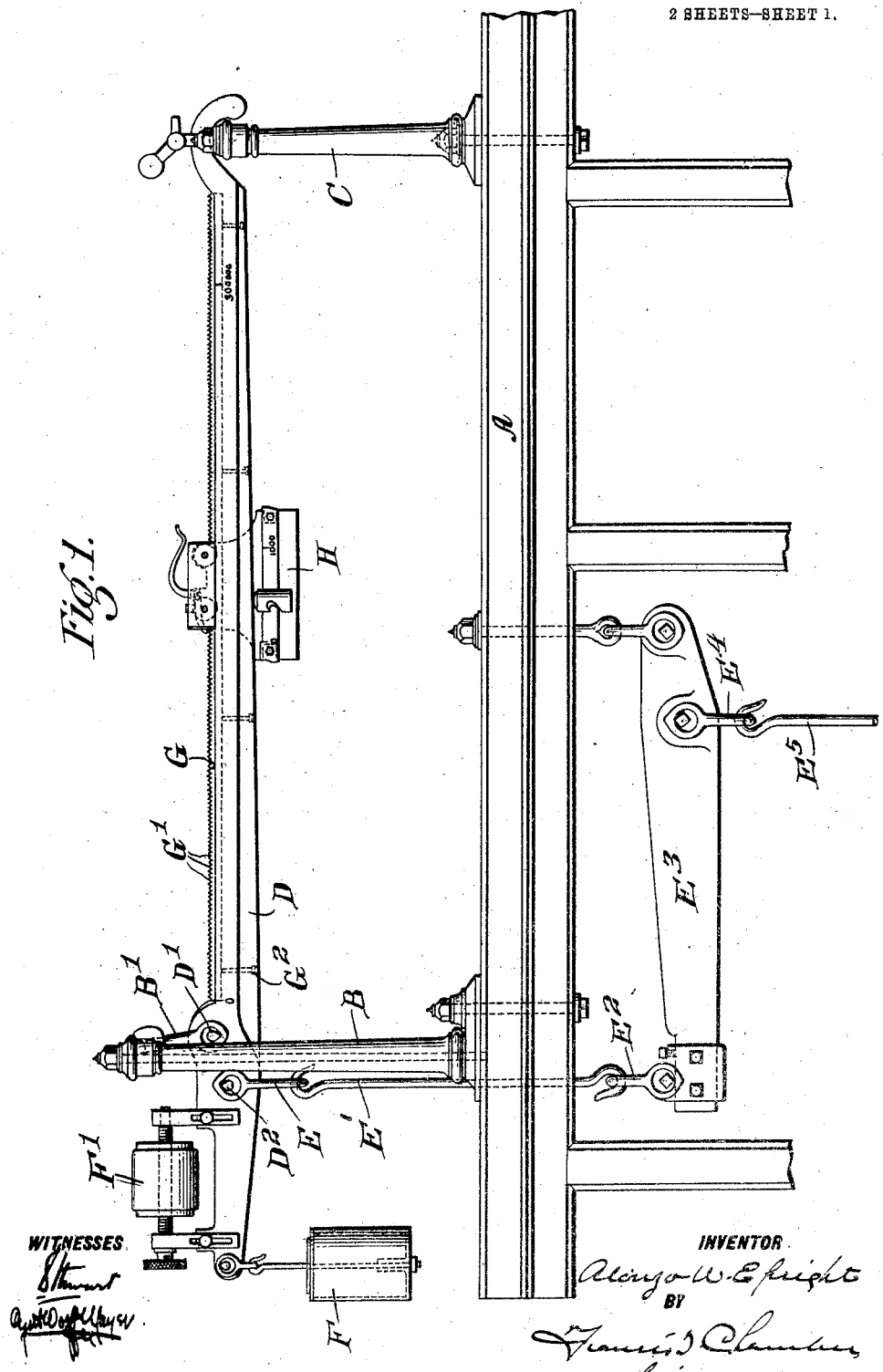

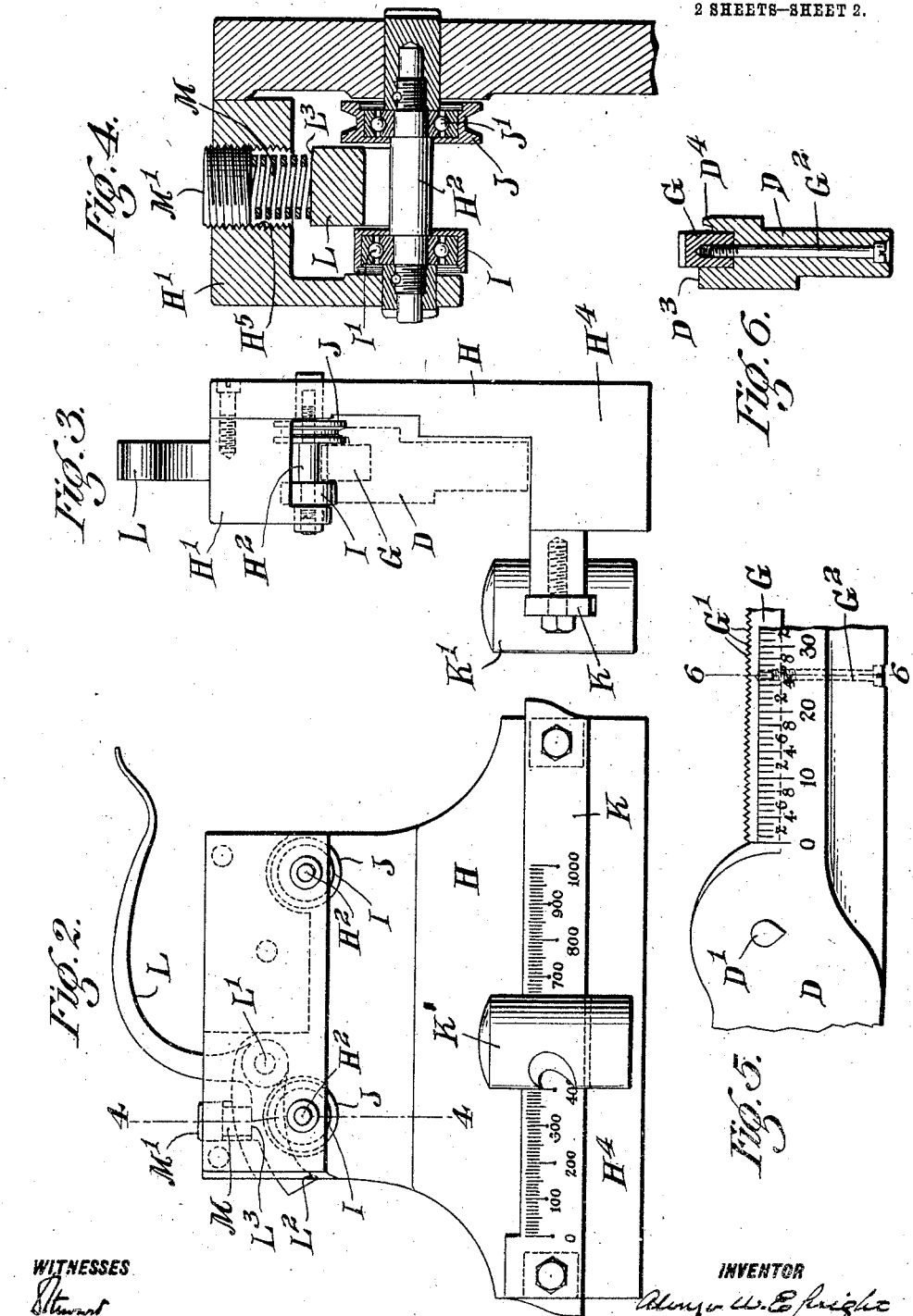

ALONZO W. EPRIGHT, OF ALTOONA, PENNSYLVANIA.

SCALE POISE AND BEAM.

1,054,963. Specification of Letters Patent. Patented Mar. 4, 1913.

Application filed June 18, 1910. Serial No. 567,559.

*To all whom it may concern:*

Be it known that I, ALONZO W. EPRIGHT, a citizen of the United States of America, risiding in Altoona, in the county of Blair, in the State of Pennsylvania, have invented a certain new and useful Improvement in Scale Poises and Beams, of which the following is a true and exact description, reference being had to the accompanying drawings, which form a part thereof.

The present invention relates to the construction and arrangement of the beam and sliding poise therein of beam scales, and the general object of the invention is to provide a beam and sliding poise construction which is conducive to rapid and accurate weighing.

The invention was primarily devised, and is especially adapted for use in railway car scales of the kind in which cars are weighed while moving continuously across the scale platform.

More specifically the object of the invention is to provide a beam and sliding poise construction for a scale of the character specified, in which provisions, independent of any mechanism for obtaining a general or approximate adjustment of the sliding poise along the beam, are made for quickly and accurately bringing the weight into exact register with the nearest scale division or graduation of the beam at the end of the adjustment of the weight along the beam into the position at which the poise approximately balances the load on the scale platform. Provisions are preferably made for adjusting the center of gravity of the poise without bodily movement of the latter along the beam to measure weights smaller than the difference between the weights balanced by the poise when in one and then in the other of an adjacent pair of beam scale divisions.

The various features of novelty which characterize my invention are pointed out with particularity in the claims annexed to and forming part of this specification. For a better understanding of the invention, however, reference should be had to the accompanying drawings and descriptive matter in which I have illustrated and described one of the forms in which the invention may be embodied.

Of the drawings: Figure 1, is an elevation of the portion of a beam weighing scale. Figs. 2 and 3 are side and end elevations respectively of the sliding poise employed, these figures being drawn to a larger scale than Fig. 1. Fig. 4 is a partial sectional elevation on the line 4—4 of Fig. 2. Fig. 5 is an elevation of a portion of the beam drawn to a larger scale than Fig. 1, and Fig. 6 is a section on the line 6—6 of Fig. 5.

In the drawings, A represents a portion of the stationary framework of the scale on which are mounted the beam supporting guiding brackets or posts B and C, from the first mentioned of which the beam D is pivotally supported in any usual or suitable manner, as by means of the yoke B' having apertured ends receiving the ends of the knife edge pivot member D'. A second knife edge pivot member $D^2$ secured to the beam D is connected to the scale platform (not shown) in any usual or suitable manner as by connections including the yoke E, rod E', yoke $E^2$, lever $E^3$, yoke $E^4$, and rod $E^5$.

F and F' represent the usual weights by which the scale as a whole is balanced.

As shown, the scale beam D is in the form of a bar provided with a groove in its upper edge in which is mounted a bar G formed on its upper side with the usual notches G' separated by the interposed wedge shaped teeth. At the sides of the bar G, the beam H is provided with guide surfaces or shoulders $D^3$ and $D^4$ forming tracks, so to speak, for the anti-friction rollers hereinafter described of the sliding poise H.

The sliding poise H mounted on the beam D comprises a vertical body portion at the side of the beam D, a heavy portion $H^4$ integral with the body portion and extending beneath the beam and a portion H' secured to the body portion and projecting over the top of the beam D. As shown, a pair of shafts $H^2$ are secured each at one end in the body of the poise H and at the other end in the member H'. These shafts extend transversely to, and lie above the beam. On each shaft $H^2$ is mounted an anti-friction roller I which travels on the track formed by the beam shoulder $D^3$ and an anti-friction roller J which travels on the track formed by the guide rib or shoulder $D^4$. Preferably as shown, the roller J is grooved and the rib $D^4$ is shaped to enter the groove in the roller J. Preferably also as shown, ball bearings I' and J' are provided for the rollers I and J respectively. A supplemental beam K, extending parallel to the main beam D, is secured to the sliding weight and on this supplemental beam in mounted a supplemental sliding poise K'.

A lever L is pivotally mounted in the sliding poise H above the guide bar G; L' representing the shaft for the lever L. One arm of the lever L is provided with a detent $L^2$ adapted to enter the notches G' in the guide-bar G, and the other arm is extended to form a finger piece by which the detent $L^2$ may be lifted out of the notches G'. To properly force the detent $L^2$ to the bottom of any notch G' in which the detent may extend at the end of the rough adjustment spring M is provided. The spring M bears at one end against the flattened portion $L^3$ formed on the lever L, and, at the other end, against an adjustable abutment M' in the form of a screw plug, threaded into a socket $H^5$ formed in the sliding poise portion H'. The upper end of the spring M preferably projects into the socket $H^5$ as shown in Fig. 4.

For reasons hereinafter explained, the spring M should be relatively powerful in its action, but should have a limited range of movement. On this account I have found it desirable in practice to form the spring M out of a solid block or rod section of steel by first boring out the rod to form a tube and then cutting a spiral groove or slot in the tube wall to thereby produce the spiral spring shown. I do not wish to be understood, however, as asserting that this mode of constructing the spring is in all cases necessary, but call attention to the manner in which I have found it desirable to make the spring to emphasize the strength and limited range of movement of the spring which I have found it desirable to use.

In the operation of weighing a car with scale mechanism of the character disclosed, the sliding poise H is adjusted by hand to approximately proper position on the scale beam, and then the final balance is obtained by adjusting the auxiliary sliding poise K' along the auxiliary beam K carried by the sliding main poise H. It will be understood that the full adjustment of the auxiliary poise K' is necessary to balance a weight variation on the scale platform which is balanced by a very much smaller adjustment of the sliding poise H as a whole along the beam D. For instance, the poise K' in a sliding scale of the character described, may serve by a movement throughout its entire range to measure a weight variation on the scale platform of one thousand pounds while the adjustment of the sliding poise H along the beam D, a distance equal to the distance between an adjacent pair of notches G', also measures a weight variation on the scale platform of one thousand pounds. In view of this fact, it is essential for accurate weighing that the sliding poise H should at the end of each adjustment be brought into exact register with a division point on the beam D. Furthermore, since in weighing cars running over the scale platform the total time in which each car must ordinarily be weighed is very short, the adjustment must be made very quickly. The lever L with its detent $L^2$ and a spring M of the character described are obviously well adapted to automatically and rapidly adjust the sliding poise H into the desired register at the end of the approximate or rough adjustment of the sliding weight.

The spring M, because of its powerful action coupled with the relative frictionless and easy manner in which the poise slides along the beam tends to go instantly to the bottom of any notch in which the detent is entered at the end of the rough adjustment, and the limited range of action of the spring M prevents the detent from bearing against the notch walls with sufficient pressure to cant the sliding weight and therefore interfere with the proper position of the weight along the beam.

Having now described my invention what I claim as new and desire to secure by Letters Patent is:

1. The combination in a weighing scale of the character described, of a beam provided with one or more poise guide surfaces and with a series of scale division notches separated by wedge shaped teeth, a poise resting on and slidable along said surface or surfaces, a detent carried by said poise and adapted to enter said notches, and a spring having a relatively powerful but limited range of action, acting on said detent and tending to center it in any notch into which it may extend, whereby said detent and spring serve as a means for bringing said poise into exact register with the beam scale division at the ends of the adjustments of the poise along the same, and without canting said poise on said beam, said poise including provisions whereby the center of gravity of said poise may be shifted without moving the poise bodily with respect to said beam to thereby measure differences in weight smaller than the difference between the weights balanced by the poise when in register first with one, and then with another of an adjacent pair of said beam scale divisions.

2. The combination in a weighing scale of the character described of a main beam provided with one or more poise guide surfaces and with a series of scale division notches separated by wedge shaped teeth, a main poise resting on and slidable along said surface or surfaces, a detent carried by said poise and adapted to enter said notches, a spring acting on said detent and tending to center it in any notch into which it may extend whereby said detent and spring serve as a means for bringing said poise into exact register with the beam scale divisions at the ends of the adjustments of said main poise along said beam, said spring being made relatively powerful in its action and with a limited range of action so that while the spring is effective to force the detent to the bottom of any notch in which it may be entered it does not urge the detent below the bottom of the notch with sufficient force to lift or cant the main poise, and means for adjusting the tension of said spring, said poise including provisions whereby the center of gravity of said poise may be shifted without moving the poise bodily with respect to said beam to thereby measure differences in weight smaller than the difference between the weights balanced by the poise when in register first with one, and then with another of an adjacent pair of said beam scale divisions.

3. The combination in a weighing scale of the character described of a beam provided with a pair of spaced apart poise guides extending longitudinally of the beam, a series of scale division notches separated by wedge shaped teeth lying between said guides, a poise provided with anti-friction rolls running on said guides and ball bearings for said rolls, a detent carried by said poise and adapted to enter said notches, a spring acting on said detent and tending to center it in any notch into which it may extend whereby said detent and spring serve as a means for bringing said poise into exact register with the beam scale divisions at the ends of the adjustment of the poise along the beam, said spring being made relatively powerful in its action and with a limited range of action so that while the spring is effective to force the detent to the bottom of any notch in which it may be entered it does not urge the detent below the bottom of the notch with sufficient force to lift or cant the poise, and means for adjusting the tension of said spring, said poise including provisions whereby the center of gravity of said poise may be shifted without bodily movement of the poise along the beam to thereby measure differences in weight smaller than the difference between the weights balanced by the poise when in register first with one and then with another of an adjacent pair of said beam scale divisions.

4. The combination in a weighing scale of the character described of a beam provided with a pair of spaced apart poise guides extending longitudinally of the beam, a series of scale division notches separated by wedge shaped teeth lying between said guides, a poise provided with anti-friction rolls running on said guides, and ball bearings for said rolls, a detent carried by said poise and adapted to enter said notches, a spring acting on said detent and tending to center it in any notch into which it may extend whereby said detent and spring serve as a means for bringing said poise into exact register with the scale beam divisions at the ends of the adjustments of the poise along the beam, said spring being made relatively powerful in its action and with a limited range of action so that while the spring is effective to force the detent to the bottom of any notch in which it may be entered it does not urge the detent below the bottom of the notch with sufficient force to lift or cant the main poise, means for adjusting the tension of said spring, and a supplemental beam mounted on said main poise and a supplemental poise resting on and slidable along said supplemental beam, whereby, by adjusting said supplemental poise along said supplemental beam without bodily movement of said main poise along said main beam, differences in weight may be measured which are smaller than the differences between the weights balanced by said main poise when it is in register first with one and then with another of an adjacent pair of scale beam divisions.

5. The combination in a weighing scale of the character described of a beam provided with poise guides extending longitudinally of the beam, and with a series of scale division notches separated by wedge shaped teeth, a poise provided with anti-friction rolls running on said guides, and ball bearings for said rolls, a detent carried by said poise and adapted to enter said notches, a helical spring acting on said detent and tending to center it in any notch into which it may extend whereby said detent and spring serve as a means for bringing said poise into exact register with the scale beam divisions at the ends of the adjustments of the poise along the beam, means for adjusting the tension of said spring, and a supplemental beam mounted on said main poise and a supplemental poise resting on and slidable along said supplemental beam, whereby, by adjusting said supplemental poise along said supplemental beam without bodily movement of said main poise along said main beam, differences in weight may be measured which are smaller than the differences between the weights balanced by said main poise when it is in register first with one and then with another of an adjacent pair of scale beam divisions.

ALONZO W. EPRIGHT.

Witnesses:
ARNOLD KATZ,
STEWART.